United States Patent
Matono et al.

(10) Patent No.: US 11,176,397 B2
(45) Date of Patent: Nov. 16, 2021

(54) OBJECT RECOGNITION DEVICE

(71) Applicant: HITACHI AUTOMOTIVE SYSTEMS, LTD., Hitachinaka (JP)

(72) Inventors: Haruki Matono, Ibaraki (JP); Takeshi Nagasaki, Ibaraki (JP); Yuhi Shiina, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 657 days.

(21) Appl. No.: 16/076,073

(22) PCT Filed: Jan. 30, 2017

(86) PCT No.: PCT/JP2017/003082
§ 371 (c)(1),
(2) Date: Aug. 7, 2018

(87) PCT Pub. No.: WO2017/163606
PCT Pub. Date: Sep. 28, 2017

(65) Prior Publication Data
US 2021/0192250 A1 Jun. 24, 2021

(30) Foreign Application Priority Data
Mar. 23, 2016 (JP) .............................. JP2016-057816

(51) Int. Cl.
*G06K 9/20* (2006.01)
*G06K 9/00* (2006.01)
(Continued)

(52) U.S. Cl.
CPC ....... *G06K 9/2054* (2013.01); *G06K 9/00805* (2013.01); *G06K 9/4609* (2013.01); *G06K 9/6215* (2013.01); *G06K 9/6857* (2013.01)

(58) Field of Classification Search
CPC ............. G06K 9/2054; G06K 9/00805; G06K 9/4609; G06K 9/6215
See application file for complete search history.

(56) References Cited

U.S. PATENT DOCUMENTS

2013/0073194 A1  3/2013  Nakamura et al.
2014/0226041 A1  8/2014  Eguchi et al.

FOREIGN PATENT DOCUMENTS

JP  2004-354572 A  12/2004
JP  2010-134535 A  6/2010
(Continued)

OTHER PUBLICATIONS

International Search Report with English translation and Written Opinion issued in corresponding application No. PCT/JP2017/003082 dated May 16, 2017.

(Continued)

*Primary Examiner* — Sam Bhattacharya
(74) *Attorney, Agent, or Firm* — Foley & Lardner LLP

(57) ABSTRACT

The purpose of the present invention is to obtain reliable recognition performance even in a lens which is capable of long-distance and close proximity photography. This object recognition device 1 comprises an image acquisition unit which acquires an image 1000 which includes a plurality of image regions 1001, 1002, 1003 which have differing resolutions, and a recognition processing unit which carries out a recognition process upon an object within the screen 1000. One image region 1003, among the plurality of image regions 1001, 1002, 1003 of the screen 1000, has a lower resolution than the other image regions 1001, 1002. The recognition processing unit carries out the recognition process of the object on the basis of assessment references which differ among the one image region 1003 and the other image regions 1001, 1002.

8 Claims, 17 Drawing Sheets

(51) Int. Cl.
*G06K 9/46* (2006.01)
*G06K 9/62* (2006.01)
*G06K 9/68* (2006.01)

(56) References Cited

FOREIGN PATENT DOCUMENTS

| | | |
|---|---|---|
| JP | 2010-283567 A | 12/2010 |
| JP | 2013-061919 A | 4/2013 |
| JP | 2013-206356 A | 10/2013 |

OTHER PUBLICATIONS

Supplementary European Search Report issued in corresponding European Patent Application No. 17769653.1 dated Oct. 16, 2019.
Anonymous "Image resolution", Wikipedia, last edited Sep. 22, 2019, DOC ID XP055629634, Retrieved from the Internet: URL:https://en.wikipedia.org/wiki/Image_resolution [retrieved on Oct. 8, 2019].
Simon Thibault, "Novel Compact Panomorph Lens Based Vision System for Monitoring Around a Vehicle", Visual Communications and Image Processing, Proceedings SPIE, vol. 7003, 2008, p. 700321-1 to 700321-9, XP055219046.

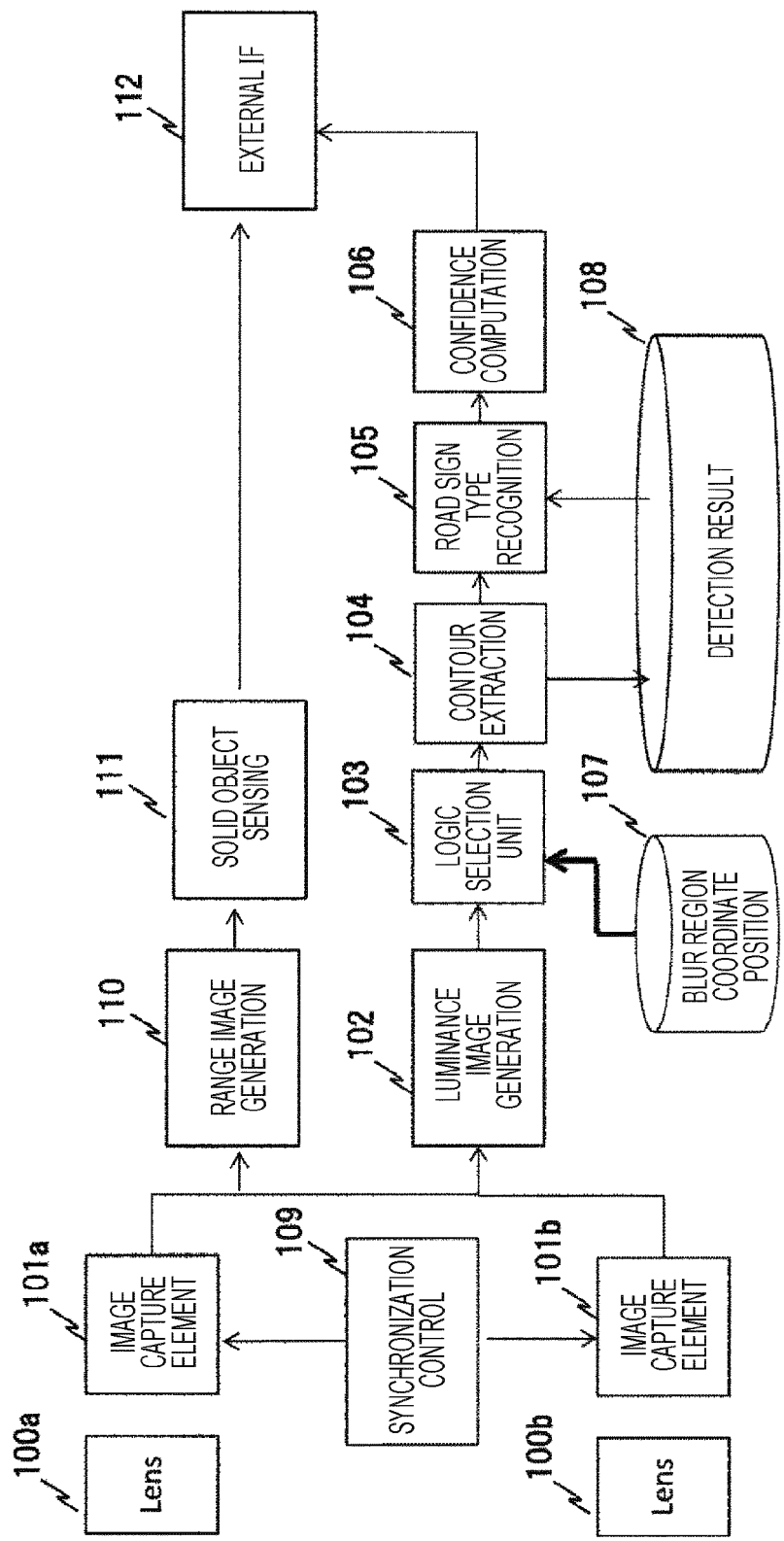

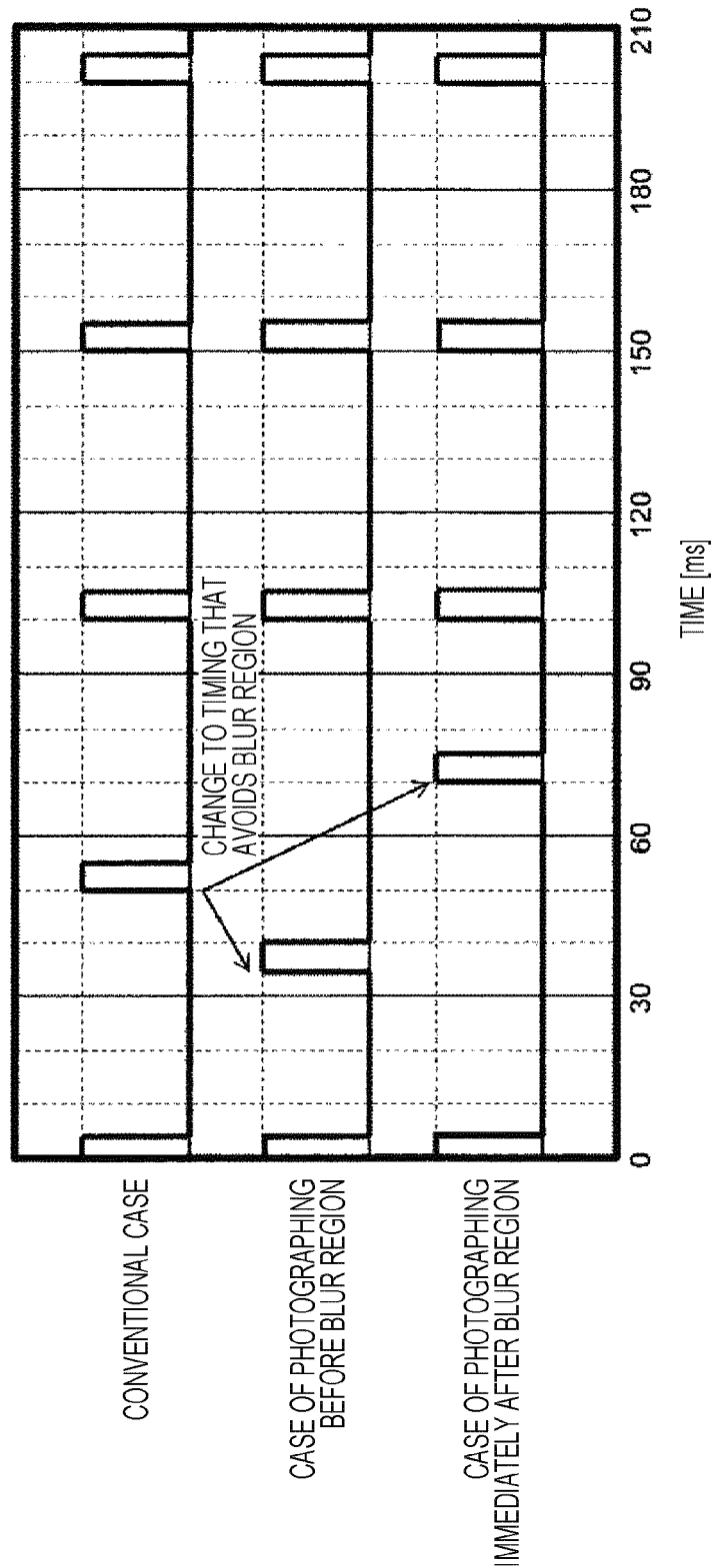

OBJECT RECOGNITION DEVICE

TECHNICAL FIELD

The present invention relates to an object recognition device.

BACKGROUND ART

PTL 1 is available as a background art in this technical field. This publication has described as a technical problem "to provide an image detection device that realizes high-speed detection process while reducing occurrence of erroneous detection when detecting a predetermined target image from an image" and has described as a solution "an image detection device (10) including: a candidate region extraction means (13) to extract a detection target region from an input image on the basis of the color similarity between individual pixels of the input image and the pixels in the vicinity region thereof or on the basis of edge intensity of the pixel around individual pixels of the input image; an edge extraction means (14) to obtain an edge direction and an edge intensity for individual pixels included in the extracted detection target region; a voting means (15) to vote on the basis of the edge direction and the edge intensity information in order to derive a region having high possibility of containing a target image; and a voting result evaluation means (16) to search for a vote value being a threshold or more with reference to the result of voting and detect a target image contained in the input image on the basis of the search result (reference: Abstract of the publication).

In addition, cameras having wide-angle lenses are conventionally known. For example, PTL 2 discloses an imaging apparatus having a wide-angle lens (also referred to as fisheye lens).

CITATION LIST

Patent Literature

PTL 1: JP 2008-307463 A
PTL 2: JP 2004-354572 A

SUMMARY OF INVENTION

Technical Problem

Attempts have been made to image both a long-distance region and a close proximity region with an imaging apparatus using a wide-angle lens. In a case, however, where a conventional wide-angle lens is used to image both the long-distance region and the close-vicinity region, there is a case where image quality is degraded in a portion of an image due to the change rate of the incident angle per image height. The portion with degraded image quality might have adverse effects on image processing to be executed thereafter.

To handle this, the present invention provides an image processing technique of reducing the effects of the portion with degraded image quality included in the image captured by an imaging apparatus.

Solution to Problem

To solve the above-described problem, configurations as described in CLAIMS are adopted, for example.

The present application includes a plurality of means for solving the above-described problem. An example of this is "to provide a mechanism that determines whether a recognition target is included in a blur region and changes a parameter for the recognition".

Advantageous Effects of Invention

According to the present invention, it is possible to reduce the effects of the portion with degraded image quality included in the image captured by an imaging apparatus. Further features related to the present invention will become apparent from the description of the present specification and the accompanying drawings. Problems, configurations, and effects other than in the above description will be clarified by the following embodiments.

BRIEF DESCRIPTION OF DRAWINGS

FIG. 1 is a functional block diagram illustrating an imaging apparatus according to a first embodiment of the present invention.

FIG. 16 is a diagram illustrating output timings of a V synchronization signal of a CMOS sensor.

DESCRIPTION OF EMBODIMENTS

Embodiments of the present invention will be described below with reference to the accompanying drawings. While the accompanying drawings are specific embodiments according to the principle of the present invention, these are presented for facilitating understanding of the present invention and not intended to limit the interpretation of the present invention.

First Embodiment

FIG. 1 is a functional block diagram illustrating a configuration of an imaging apparatus to which an object recognition device of the present invention is applied.

An imaging apparatus 1 is used in a state of being mounted on an own vehicle, and includes a left-right pair of first and second imaging units for capturing images of the vehicle front, and arithmetic units (102 to 112). In addition, a control unit (not illustrated) is provided in an external interface (IF) 112 of the imaging apparatus 1.

The imaging apparatus 1 allows the first and second imaging units to simultaneously image the vehicle front, and allows the arithmetic units (102 to 112) to calculate a parallax using a plurality of images, so as to calculate a distance from the vehicle to the target object in the front on the basis of the parallax. Then, the arithmetic units (102 to 112) recognize the target object using the distance to the target object. The control unit performs vehicle control such as brake control using the recognition result of the target object.

Since the left-right first and second imaging units are set apart from each other by a base line length in the left and right direction, the right and left images of the vehicle front captured at the same time have the same target object imaged with a position shift in right-left direction. That is, even when the same target object is imaged, the positions of the object on the left-right pair images on the screen are shifted to the left and right.

The first imaging unit includes an optical element 100a and an image capture element 101a. The optical element 100a includes an imaging lens having a structure that refracts light to form an image on the image capture element 101a.

The image capture element 101a receives an image of light refracted by the optical element 100a and generates an image according to the intensity of the light. The image capture element 101a is installed at a position where the light transmitted through the optical element 100a passes, and has the function of an electronic shutter so as to process light during a predetermined time. Note that the first imaging unit may have a physical shutter function. Examples of the image capture element 101a include charge coupled device (CCD) image sensors, and complementary metal oxide (CMOS) image sensors.

Figure 2A:
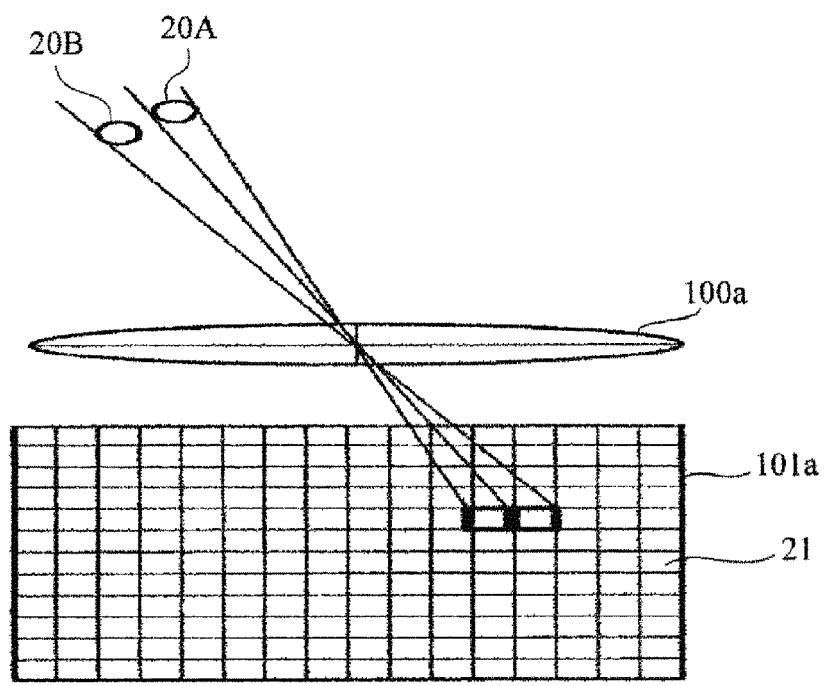
FIG. 2A is a diagram illustrating ranging accuracy in a case where angular resolution is high.
Figure 2B:
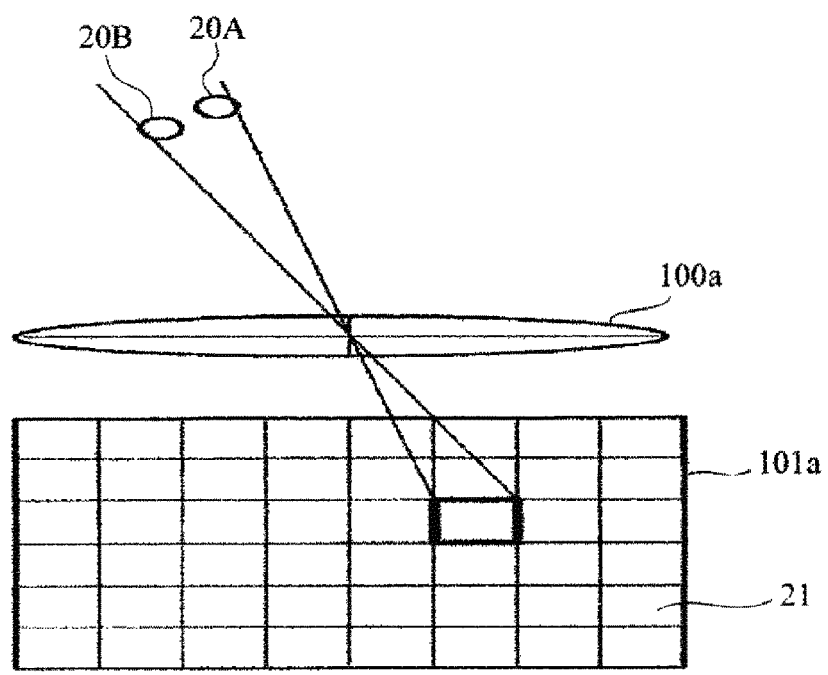
FIG. 2B is a diagram illustrating ranging accuracy in a case where the angular resolution is low.

Next, the imaging lens used in the present embodiment will be described. As described above, the arithmetic units (102 to 112) measure the distance to the target object. Here, a relationship between angular resolution and ranging, that is, distance measurement will be described with reference to FIGS. 2A and 2B. FIG. 2A is a diagram illustrating ranging accuracy with high angular resolution. FIG. 2B is a diagram illustrating ranging accuracy with low angular resolution. The incident angle expressed by one pixel has a width, and in a case where it is within the incident angle indicated by a straight line, the imaging apparatus 1 can recognize that the target object exists in the same direction.

For example, when the angular resolution of the optical element 100a is high as illustrated in FIG. 2A, the incident angle captured by one pixel 21 of the image capture element 101a is narrow, making it possible to identify each of the plurality of target objects 20A and 20B, leading to an increase in the ranging accuracy. In a case, however, as illustrated in FIG. 2B, where the angular resolution of the optical element 100a is low, the incident angle by which one pixel of the image capture element 101a can be captured is wide. This makes it difficult to discriminate the plurality of target objects 20A and 20B, leading to a failure in accurate measurement of the target objects 20A and 20B. For this reason, there is a need to increase the angular resolution for the incident angle that needs accurate measurement of the distance to the target object.

Figure 3:
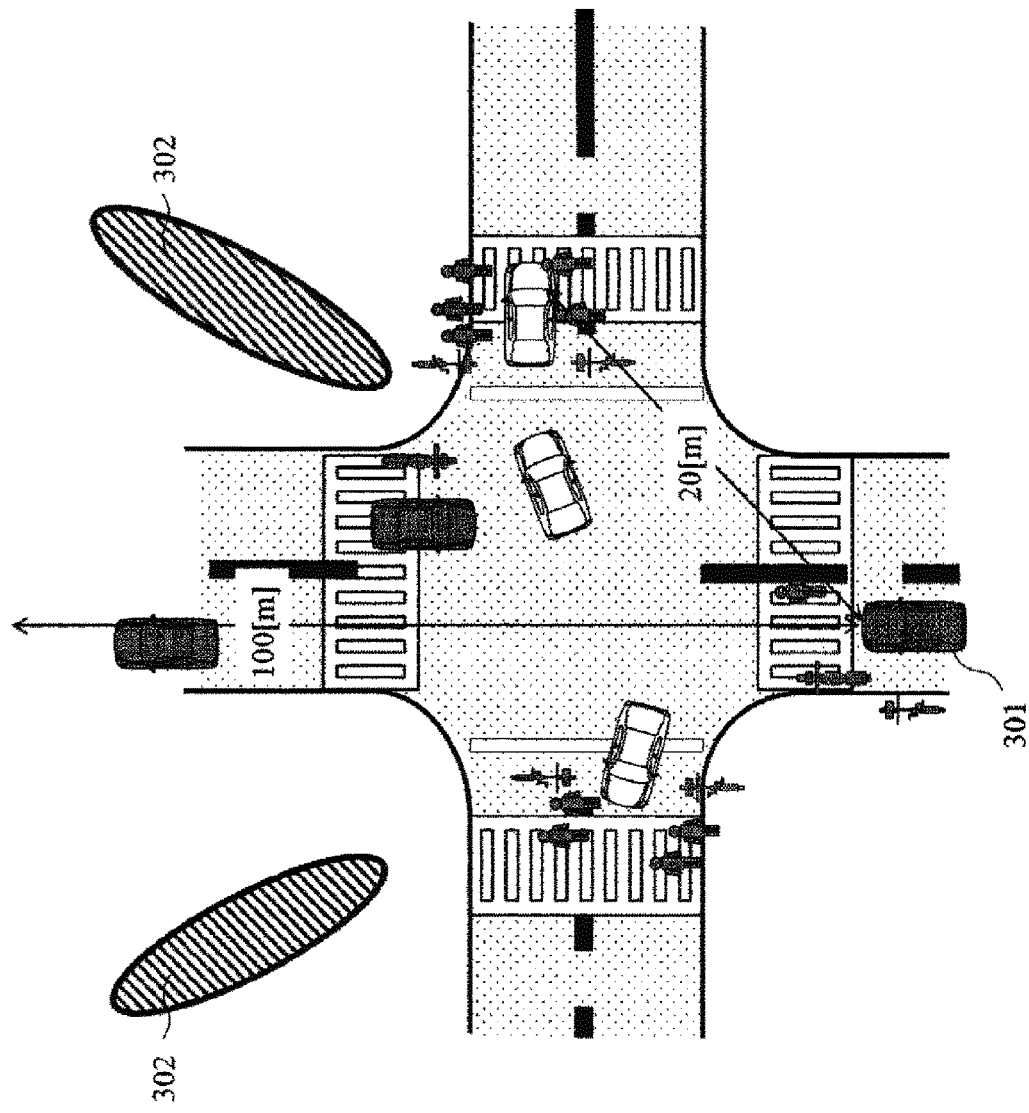
FIG. 3 is a diagram schematically illustrating an area to be imaged by an in-vehicle stereo camera.

FIG. 3 is a diagram schematically illustrating an area to be imaged by the in-vehicle stereo camera of the present embodiment. First, a function of automatically tracking a front vehicle in the automatic driving application will be described. With this function, there is a need to recognize a target object (vehicle traveling ahead) located at a long distance (for example, about 100 m) in front of a vehicle 301. For example, in a case where the vehicle 301 travels on an expressway, there is a possibility of providing a relatively long inter-vehicle distance. Therefore, an error of ranging during traveling on a highway would greatly affect the inter-vehicle distance, and thus, highly accurate ranging is necessary even for a long-distant region in the neighborhood of the front. For this reason, the angular resolution needs to be high in a region with a small incident angle.

Next, an anti-collision function in automatic driving application will be described. In the anti-collision function at an intersection or the like, there is a need to sense people and vehicles jumping out from the sideways, leading to a necessity of imaging as wide an incident angle as possible. In addition, people or vehicles having possibility of collision are in relatively close ranges. As described above, photographing in a long distance is required for the front and photographing with wide incident angle is required in peripheral directions.

Figure 4:
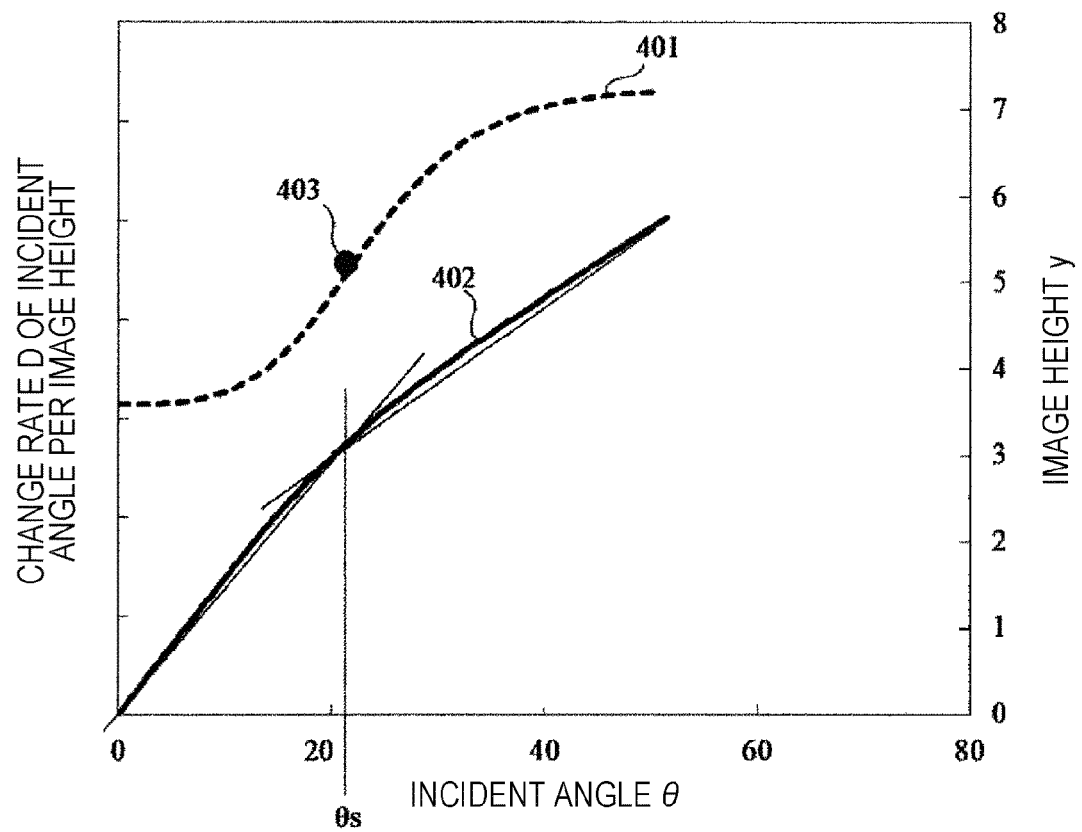
FIG. 4 is a graph illustrating an example of a relationship of each of a change rate D of an incident angle per image height and an image height y, with respect to an incident angle θ, in an imaging lens of the first embodiment.

In the present embodiment, in order to obtain necessary angular resolution over the entire photographing area while widening the photographing angle of view, an imaging lens having the characteristics described in FIG. 4 is used. FIG. 4 is a graph illustrating an example of a relationship of each of a change rate D of an incident angle per image height and an image height y, with respect to an incident angle θ, in the imaging lens of the present embodiment. Here, the image height y is a value representing the image position on an evaluation surface of an optical system by the distance from an optical axis. Reference numeral 401 is a graph illustrating the change rate of the incident angle. Reference numeral 402 is a graph illustrating the image height. Reference numeral 403 is an inflection point in the change rate of the incident angle, and a switching incident angle θs is the incident angle corresponding to this inflection point.

The imaging lens according to the present embodiment is characterized in that the switching incident angle θs of the change rate of the incident angle per image height is in the range of 10° to 30°. In a case of being used for in-vehicle equipment, it is desirable that the incident angle θs of the change rate of the incident angle per image height be in the range of 10° to 30°. The sensing distance required for driving support for the driver and each of incident angles for each of applications required for automatic driving is comparatively short in the region of 10° to 30°. That is, the required angular resolution accuracy is relatively low. Therefore, an incident angle of 10° to 30° tends to be allowable even with low angular resolution accuracy. With a transition region of angular resolution in which the angular resolution is likely to vary, it is possible to provide a ranging system capable of photographing a wide angle of view while measuring a relatively long distance at a center with robustness and not likely to cause failure in the processing as the in-vehicle ranging system even with a distance calculation error due to the variation in angular resolution.

From the above, the imaging lens used in the present embodiment has a characteristic having the inflection point 403 of the change rate D of the incident angle per image height with respect to the incident angle at a predetermined inflection point incident angle (θs), being different in this point from the conventional imaging lens in which the change rate of the incident angle per image height monotonically changes. Note that in a case where an image capture element such as a CCD image sensor or a CMOS image sensor is adopted as the image capture element, the number of pixels included per unit incident angle is an indicator as the imaging lens. In FIG. 4, the portion in which the change rate D of the incident angle per image height is gentle tends to have less variation in angular resolution and higher angular resolution. In contrast, the portion including the inflection point 403 (portion where the graph rises) of the change rate D of the incident angle per image height is a transition region of angular resolution where the angular resolution is likely to vary as described above, with reduced angular resolution in some cases. Consequently, with focus on the image capture element 101a, the imaging lens used in the present embodiment is an imaging lens having a characteristic of including a portion with a higher change rate in angular resolution between the central portion and the peripheral portion, compared with the central portion and the peripheral portion.

In the imaging lens according to the present embodiment, the magnification of a small incident angle site having an incident angle smaller than the inflection point incident angle (θs) is set to be greater than the magnification of a large incident angle site having an incident angle larger than the inflection point incident angle (θs). Accordingly, in application on a device (such as a ranging system) using the imaging lens mounted on a vehicle, the sensing distance required for each of incident angles for individual application needed in situation such as driving support for the driver and automatic driving is set long in the center and short in the peripheral direction. With the imaging lens having the above characteristics, it is possible to achieve a measurement distance long in the central region with a small incident angle, while achieving a wide photographing range in the peripheral portion with a large incident angle although the measurement distance is short in this peripheral portion.

Figure 5:
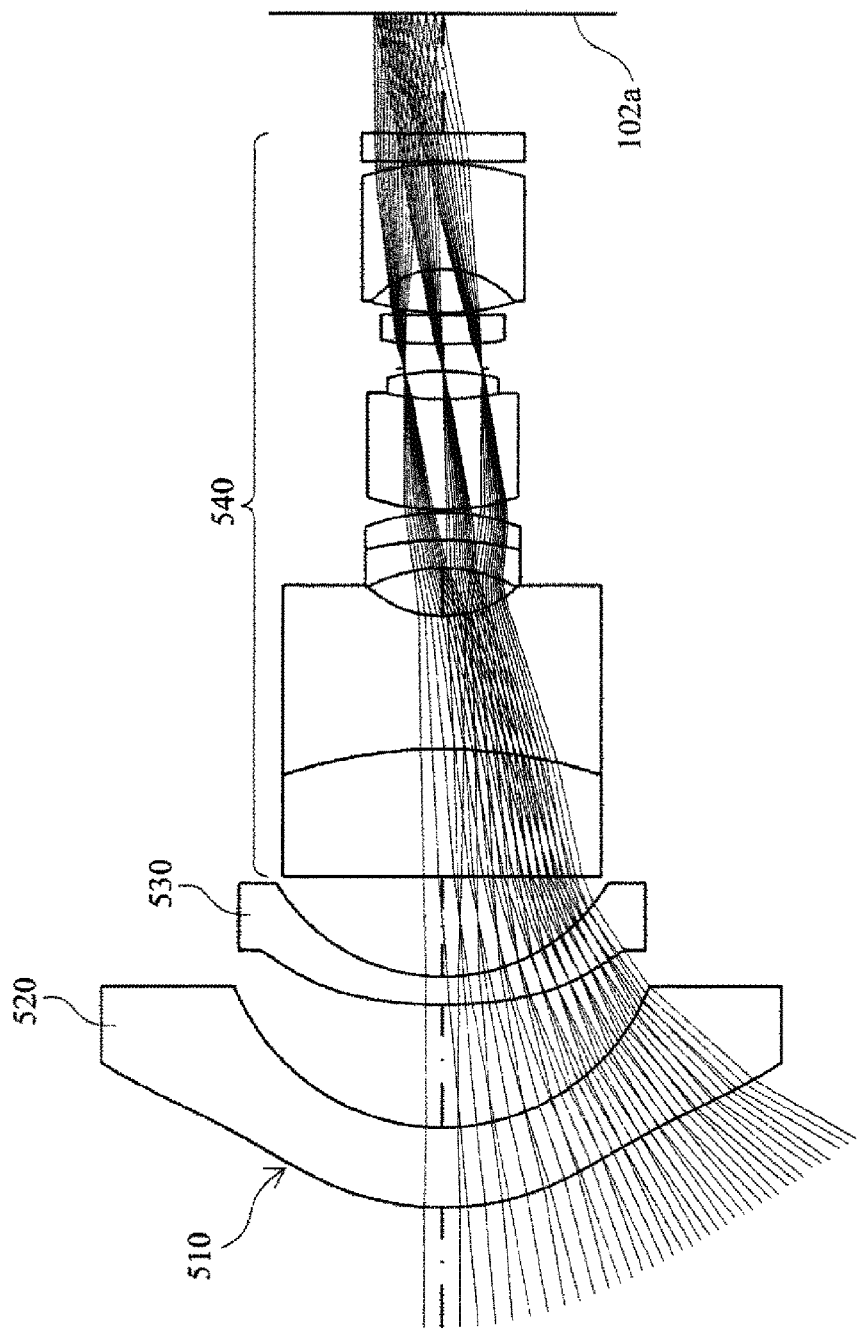
FIG. 5 is a diagram illustrating a lens configuration of the imaging lens of the first embodiment.

A lens configuration of the imaging lens having the optical characteristics as described above will be described with reference to FIG. 5. FIG. 5 is a diagram illustrating a lens configuration of the imaging lens of the first embodiment. This lens is formed with two aspherical lenses 520 and 530 and a spherical lens group 540. The light rays incident on a lens incidence first surface 510 are guided by the two aspherical lenses 520 and 530 on the light ray incident side so as to obtain a relationship between the desired image height and the incident angle, and an image is formed on the image capture element 101a by a rear group spherical lens group 540.

Note that the configuration in FIG. 5 is an example, and the configuration is not limited thereto. For example, an IR filter for absorbing infrared rays may be added to a lens exit surface in the configuration of FIG. 5. Moreover, while the example of FIG. 5 uses two aspherical lenses denoted by reference numerals 520 and 530, it is allowable as another example to form the lenses denoted by reference numerals 520 and 530 with aspherical on both sides. In addition, the imaging lens of the present embodiment is mostly characterized by the two aspherical lenses on the incident surface. Therefore, the configuration of the conventional imaging lens may be used for the lens configuration of the subsequent rear groups.

Figure 6:
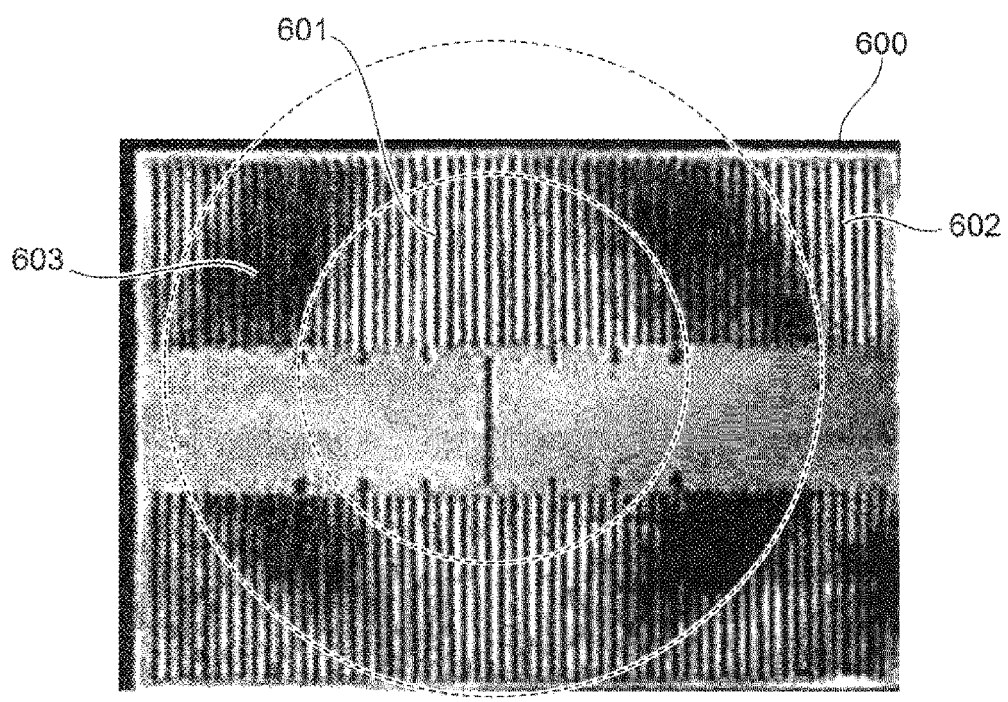
FIG. 6 is a diagram illustrating a portion of an image captured using the imaging lens of the first embodiment.

Meanwhile, the camera using the imaging lens having the above-described optical characteristics has image quality degradation at a portion of the inflection point of the change rate of the incident angle per image height. FIG. 6 illustrates an extracted portion of an image captured by a camera including an imaging lens having the optical characteristics as described above. An inner image region 601 of the image 600 illustrated in FIG. 6 is imaged in the central region of the imaging lens. An outer image region 602 is imaged in the peripheral region of the imaging lens. An inflection point corresponding image region (blur region) 603 is imaged in a region between the central region and the peripheral region of the imaging lens. It can be seen that the region 603 has a lower resolution and is more blurred than the regions 601 and 602.

Note that the image 600 in FIG. 6 is not an actual image obtained by the above-described camera, but an image with contrast or the like adjusted for the purpose of clarity in illustrating the blur region. Herein, the blur region is a region with lower resolution in the image. Resolution represents how fine things can be resolved. Indicators representing resolution include response functions (modulation transfer function: MTF, modulation transfer function, amplitude transfer function). Other examples include point spread function (PSF) and line spread function (LSF). In the present embodiment, MTF is used as an indicator for resolution. MTF refers to a resolution characteristic indicator of a quantitative measure representing a spatial resolution and is a function representing a response to each of spatial frequencies.

A relationship between the above-described blur region and the imaging lens according to the present embodiment will be described with reference to FIG. 3. As illustrated in FIG. 3, there is a need to recognize a target object (vehicle traveling ahead) present at a long distance (for example, about 100 m) in relation to the front direction of the vehicle 301. Therefore, the central region (region with a small incident angle with respect to the optical axis) of the imaging lens is set to have high resolution. In addition, since there is a need to recognize the target object in the peripheral region of the imaging lens (region with a large incident angle with respect to the optical axis) at a short distance (for example, about 20 m) from the vehicle 301, the region is set to have high resolution.

In contrast, the portion indicated by 302 in FIG. 3 is a region that need not be recognized during driving of the vehicle, leading to low necessity of acquisition in the automatic driving application as information of the image. Therefore, the inflection point 403 of the change rate D of the incident angle per image height is set in this portion.

As described above, as an example, the inflection point 403 exists in the incident angle range of 10° to 30°. With this configuration, a sharp change portion (portion including the inflection point 403) of the change rate D of the incident angle per image height exists between the central region and the peripheral region of the imaging lens. The region corresponding to the inflection point 403 corresponds to the blur region 603 in the image in FIG. 6.

Figure 7:
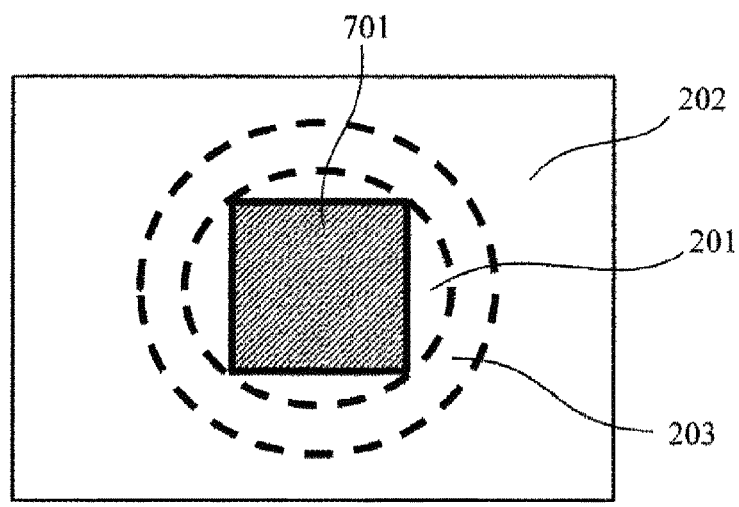
FIG. 7 is a diagram schematically illustrating an image captured using the imaging lens of the first embodiment.

FIG. 7 is a diagram schematically illustrating an image captured using the imaging lens having the optical characteristics as described above. The imaging lens of the present embodiment is an imaging lens capable of photographing both long-distance and close vicinity, making it possible to obtain an image including a plurality of image regions having different resolutions. In the image, one image region of the plurality of image regions has a lower resolution than another image region. The image includes a first region (inner image region) 201, a second region (outer image region) 202, and a third region (inflection point corresponding image region) 203.

The first region 201 is a region (hereinafter referred to as "small incident angle region") in which the incident angle with respect to the optical axis of the imaging lens is small, and corresponds to the central region of the imaging lens. The first region 201 is a region that covers a long distance (a first distance range 801).

The second region 202 is a region (hereinafter referred to as "large incident angle region") having a large incidence angle with respect to the optical axis of the imaging lens and corresponds to the peripheral region of the imaging lens. The second region 202 is a region that covers a short distance (a second distance range closer than the first distance range).

The third region 203 exists between the first region 201 and the second region 202. The third region 203 is an annular or toroidal region and corresponds to an abrupt change portion (including the inflection point 403) of the change rate D of the incident angle per image height. The third region 203 (another image region) has a lower resolution compared with the first region 201 and the second region 202 (one image region).

Figure 8:
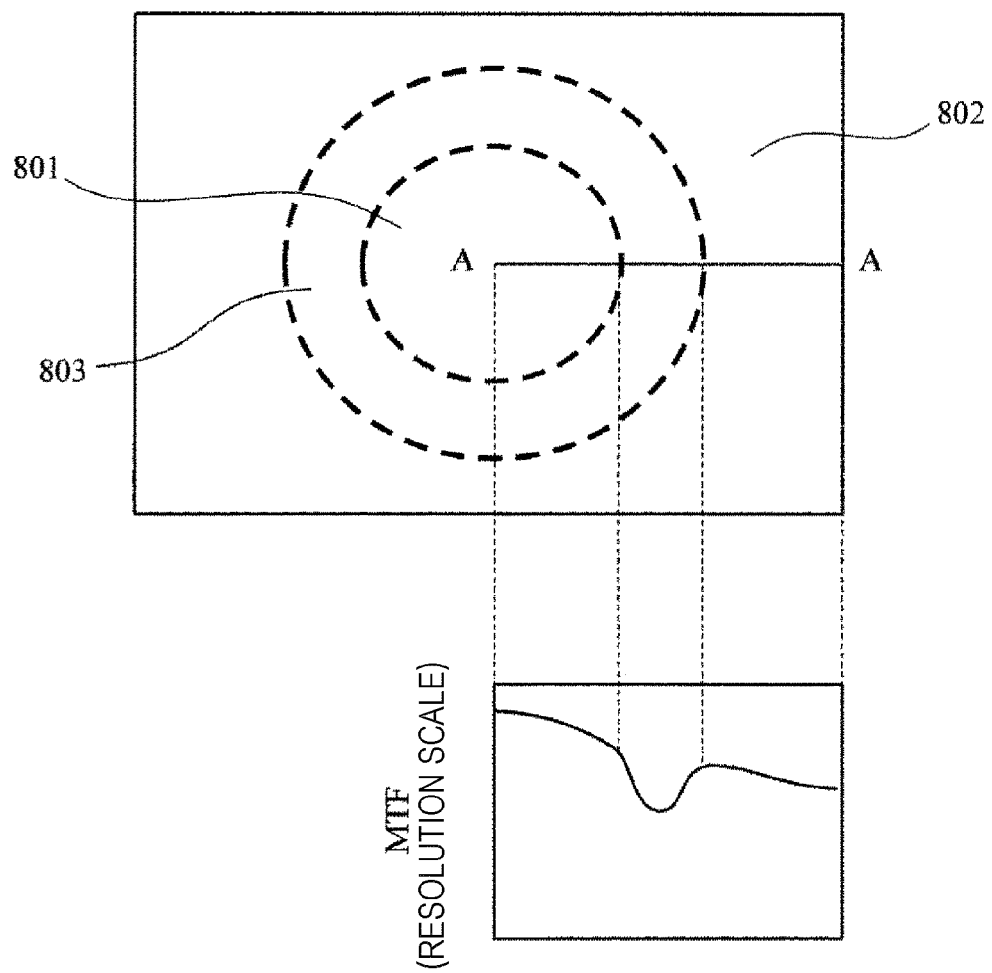
FIG. 8 is a diagram illustrating a change in resolution of an image captured using the imaging lens of the first embodiment.

FIG. 8 is a diagram illustrating a change in resolution of an image captured using the imaging lens of the first embodiment. In illustration of the change of the resolution (MTF) taken along line A-A on the image of FIG. 8, the resolution gradually decreases from the center to the outside of the image, then sharply decreases in the toroidal third region 803, and thereafter, the resolution increases at the second region 802 and returns to the former pattern. Therefore, in specifying the imaging lens according to the present embodiment from the image captured by the imaging lens, this imaging lens is also referred to as a lens having a characteristic including an intermediate incident angle region having resolution lower than that of the small incident angle region having a small incident angle with respect to the optical axis and the large incident angle region having a large incident angle with respect to the optical axis, between the small incident angle region and a large incident angle region. In other words, the imaging lens of the present embodiment is a lens designed to allow the third region 803 between the first region 801 and the second region 802 in the image to have an inflection point of resolution.

Hereinafter, embodiments for solving another problem occurring in images captured using the imaging lens having the optical characteristics as described above will be described. Specifically, the present embodiment provides a technique for maintaining the recognition accuracy even in the region of the third region 203 having a lower resolution.

Similarly to the first imaging unit, the second imaging unit includes an optical element 100b and an image capture element 101b. Since the second imaging unit has a configuration similar to that of the first imaging unit, explanation will be omitted. The design of the imaging lens of the optical element 100b is similar to that of the optical element 100a.

The imaging apparatus 1 includes: a solid object sensing processing unit that generates a range image using images captured by each of the first imaging unit and the second imaging unit and senses a solid object from the range image; and a recognition processing unit that recognizes the type of a road sign using the image captured by either one of the first imaging unit and the second imaging unit.

A synchronization control unit 109 illustrated in FIG. 1 generates a signal (V synchronization signal) for synchronizing the images captured by the first imaging unit and the second imaging unit. For example, with the setting of the first imaging unit and the second imaging unit to synchronize at the leading edge of the signal, a signal of 50 ms cycle is output from the synchronization control unit 109, making it possible to photograph same timing images by the first imaging unit and the second imaging unit.

<Solid Object Sensing Processing Unit>

The solid object sensing processing unit includes a range image generation unit 110 and a solid object sensing unit 111. The range image generation unit 110 generates data that includes output of the distance of each of pixels from the output results of the left and right image capture elements 101a and 101b. A known technique may be used for calculating the distance.

The solid object sensing unit 111 performs a process of extracting a solid object on the road from a three-dimensional point group output from the range image generation unit 110. An example of solid object sensing is a method of first detecting a road surface and then detecting an object located on the road surface and having a same distance in the longitudinal direction of the screen as a solid object. Specifically, a histogram of distances for each of abscissa is obtained in the vertical direction of the image. The solid object is assumed to be standing perpendicular to the road with respect to the road. Then, taking a histogram in the vertical direction on the screen has a same distance peak. This peak can be detected to sense a solid object.

<Recognition Processing Unit>

The recognition processing unit includes a luminance image generation unit 102, a logic selection unit 103, a contour extraction unit 104, a road sign type recognition unit 105, a confidence computation unit 106, and a storage unit 107.

First, the luminance image generation unit 102 will be described. The luminance image generation unit 102 acquires an image from either the left or right image capture element (image acquisition unit), and generates an image of brightness. A typical image capture element is a color sensor having a Bayer pattern including pixels having a color filter attached. This type of sensor uses a process referred to as demosaicing that converts the Bayer pattern to an RGB image or a luminance image.

Next, the logic selection unit 103 will be described. The logic selection unit 103 selects image processing depending on whether a coordinate position of a candidate object in the image is included in the blur region obtained in advance. The logic selection unit 103 acquires information indicating the coordinate position of the blur region in the image from the storage unit 107.

One of applications that performs recognition using one of the left and right images (image captured by one of the first and second imaging units) is a function of sensing a road sign. In the process of sensing a road sign, an edge portion is extracted from the screen to search for a circle. Next, a character in the circle is analyzed to recognize the type of the road sign.

In a case where the coordinate position of the road sign candidate as a candidate object is included in the blur region within the image, it is possible to stably detect the edge by reducing a contour extraction threshold of the contour extraction unit 104 described in the following. Here, when the threshold is constantly made small, a circle cannot be stably detected because it contains a large amount of noise. However, with a prior knowledge that it is a blurred region, the amount of noise contained would not be so large even with a reduced threshold. The contour extraction unit 104 detects the grayscale edge of the pixels constituting the image and extracts the contour of the road sign on the basis of the edge.

Next, the road sign type recognition unit 105 will be described. The road sign type recognition unit 105 discriminates a character string and a symbol within the contour to identify the road sign. As a discrimination method, it is allowable to use a known method such as a scheme of preparing a dictionary from a plurality of images in advance.

Next, the confidence computation unit 106 will be described. The confidence computation unit 106 performs scoring to the one determined by the road sign type recognition unit 105 to have a high degree of matching as the one having high confidence. In addition, sensing results of the past frames are retained, and in a case where the results are the same type result in a plurality of times of sensing, a high score is given. With accumulation of the past frame information for judging the type in this manner, even when the type is incorrectly judged with the noise caused by light conditions or the like, it is still possible to comprehensively determine the type results of a large number of times of sensing, leading to further reliable recognition of road sign types.

Figure 9:
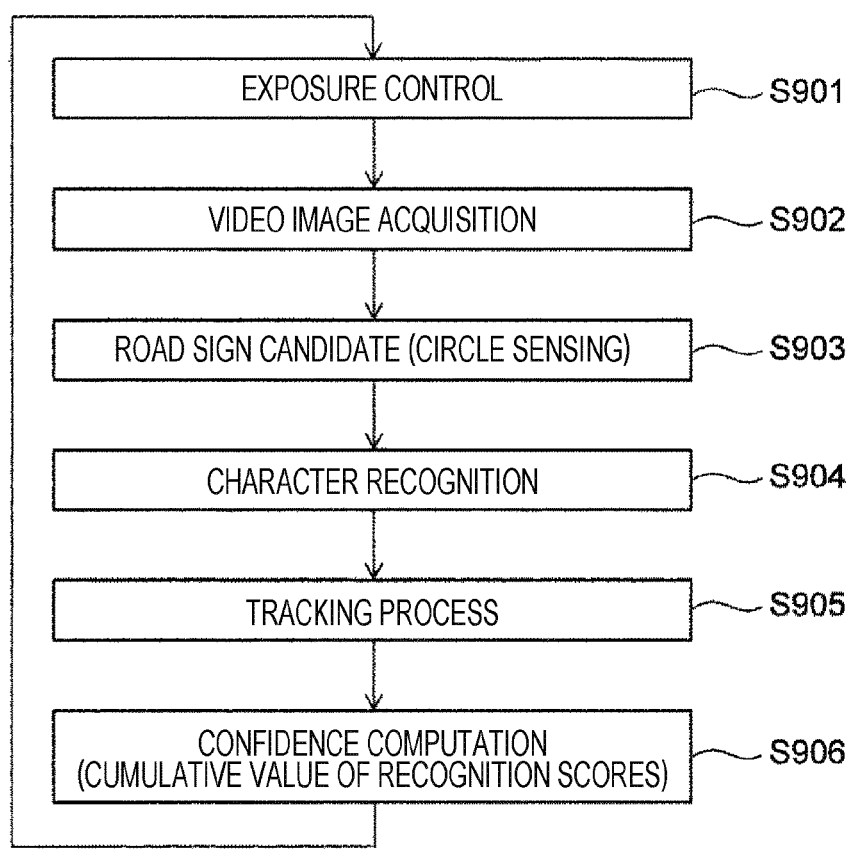
FIG. 9 is a flowchart illustrating a function of sensing road signs according to the first embodiment.

FIG. 9 is a flowchart illustrating the function of sensing road signs according to the first embodiment. First, exposure control is performed (S901), and an image is obtained (S902) (image acquisition unit). Then, a circle sensing is performed within the image to determine a road sign candidate (S903), and character recognition (S904) is performed. Then, a tracking process is performed (S905), and the confidence is calculated on the basis of a cumulative value of the recognition scores (S906).

Figure 10:
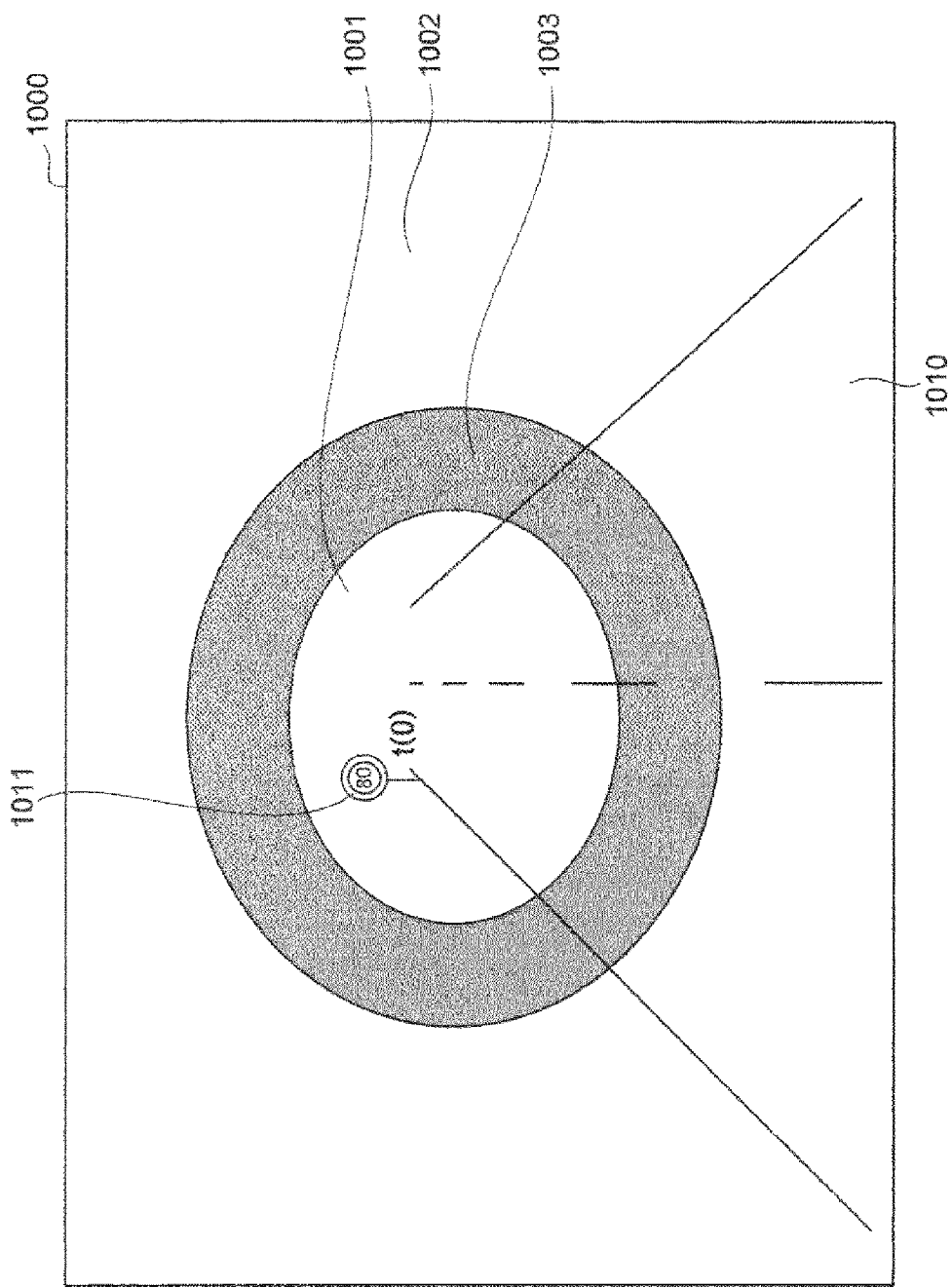
FIG. 10 is an illustrative view of an image captured at a timing of time t(0).
Figure 11:
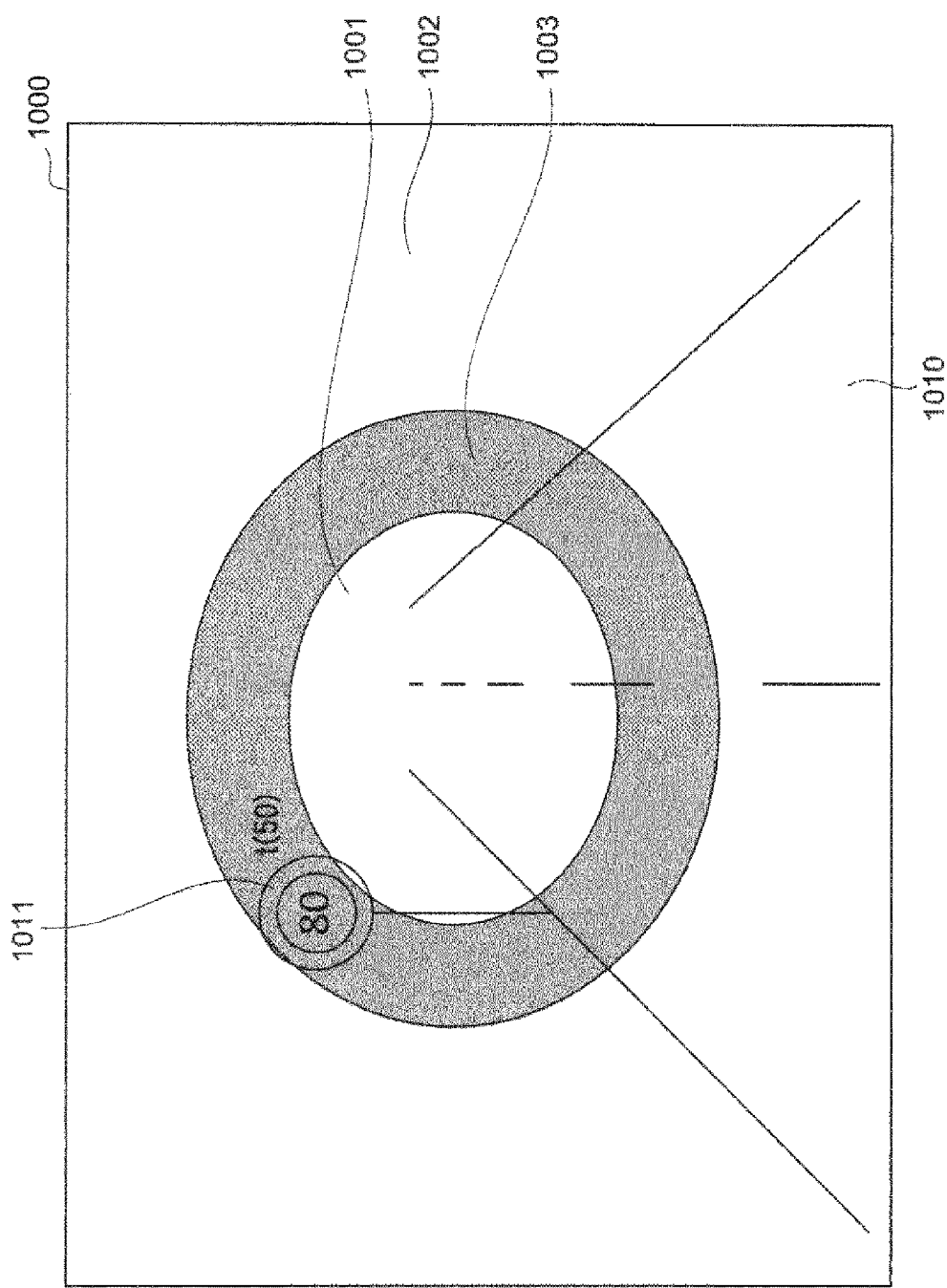
FIG. 11 is an illustrative view of an image captured at a timing of time t(50).

Now, an illustrative view in which the road signs are projected onto the screen in time sequence will be described with reference to FIGS. 10, 11, and 12. FIG. 10 is an illustrative view of a screen imaged at the timing of time t(0). FIG. 11 is an illustrative view of the screen imaged at the timing of time t(50). That is, the timing after the image capture element advances one frame from time t(0) is time t(50).

At this time, as illustrated in FIG. 11, a road sign 1011 to be detected overlaps with the previously obtained blur region 1003. The blur region 1003 is an annular or toroidal third region (inflection point corresponding image region) between the first region (inner image region) 1001 corresponding to the central region of the imaging lens and the second region (outer image region) 1002 corresponding to the peripheral region of the imaging lens. The blur region 1003 is a region with lower resolution compared with the first region 1001 and the second region 1002.

Since the road sign 1011 is a stationary object built on the side of a road 1010, the road sign 1011 comes closer to the camera in the next frame (image captured at time t(50)) by the speed of an own vehicle. With this property, it is possible to estimate whether the road sign 1011 enters the blur region 1003 at the next time t(50) on the basis of the position of the road sign 1011 at time t(0) and the speed of the own vehicle.

As illustrated in FIG. 11, in a case where the estimated coordinate position of the road sign 1011 at time t(50) is included in the blur region 1003, the road sign type recognition unit 105 uses a template or dictionary dedicated to the blur region having a smaller threshold than the one used for the first region 1001 and the second region 1002 to perform road sign type recognition of the road sign 1011, making it possible to discriminate the type of the road sign 1011 with higher accuracy. Successful recognition of the road sign type also at time t(50) similarly to the case at time t(0) would produce an advantageous result for the above-described mechanism (S905 and S906) that a plurality of times of the same road sign results leads to the probability of successful detection with high confidence.

The road sign type recognition unit 105 is capable of performing an object recognition process by pattern matching using different pattern templates for one image region, that is, the first region 1001 and the second region 1002, and the other image region, that is, the blur region (third region) 1003. In addition, the road sign type recognition unit 105 may be configured to perform the object recognition process by using different thresholds related to the luminance value for the one image region, that is, the first region 1001 and the second region 1002, and the other image region, that is, the blur region (third region) 1003. For example, it is allowable to perform the road sign type recognition process of the blur region 1003 using a threshold of the luminance value, that is smaller than the threshold of the first region 1001 and the second region 1002, making it possible to discriminate the road sign type with higher accuracy.

Figure 12:
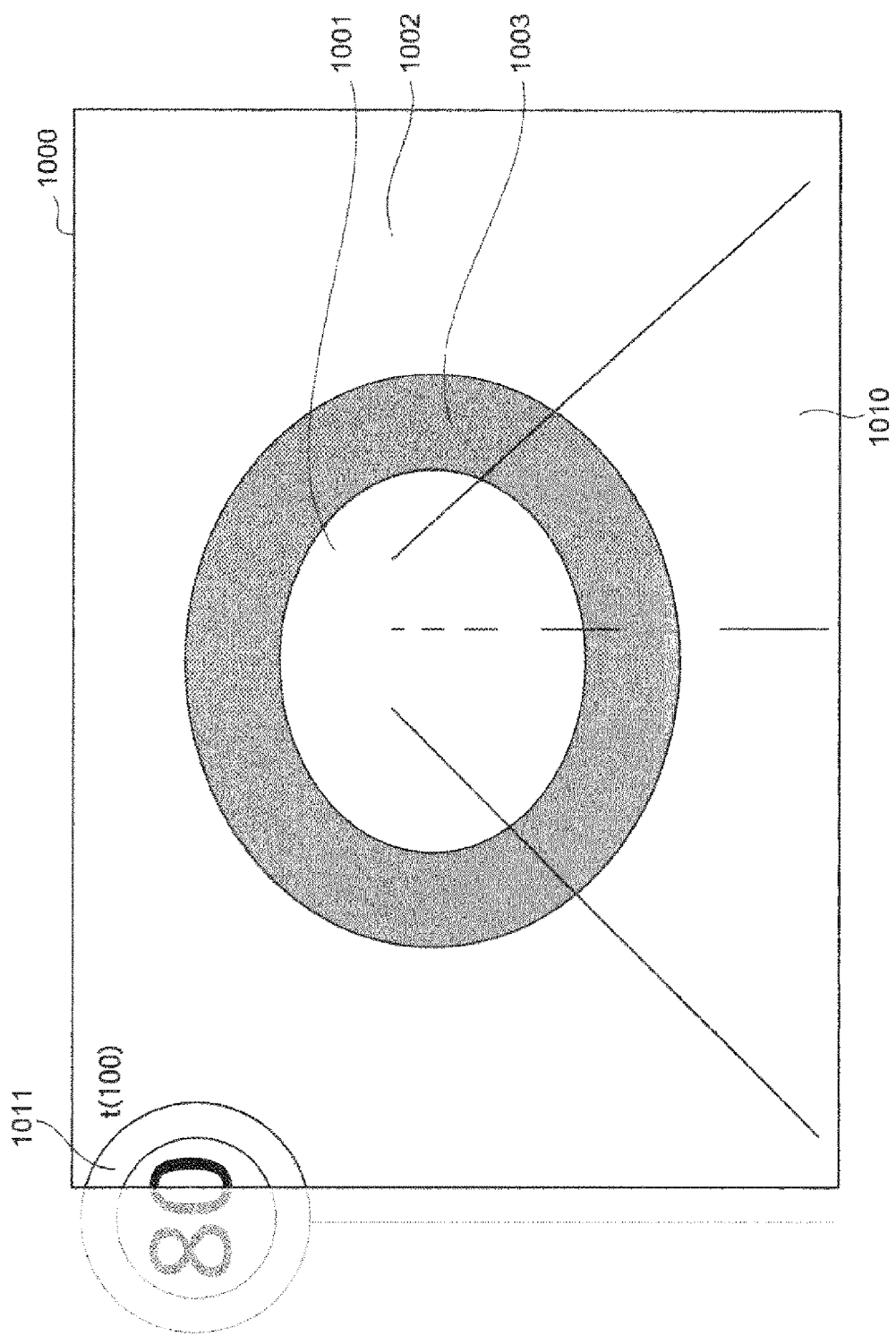
FIG. 12 is an illustrative view of an image captured at a timing of time t(100).

FIG. 12 is an illustrative view of an image captured at the timing of time t(100). FIG. 12 illustrates a situation in which a portion of the road sign 1011 has gone out of a screen 1000 at the timing of time t(100). Generally, an image projected largely on the screen 1000 has more details, facilitating the recognition process. Accordingly, in a case where the road sign 1011 cannot be detected from the image captured at time t(50), the road sign 1011 comes out of the screen 1000 even in the image captured at time t(100). This leaves a chance of recognition processing to be performed only with a small image of time t(0). In this sense, it is very important to detect the road sign 1011 from the image captured at time t(50).

According to the imaging apparatus 1 of the present embodiment, the image captured by the imaging lens is characterized in that the one image region, that is, the third image region has a lower resolution than the other image regions, that is, the first image region and the second image region, among the plurality of first to third image regions. Then, the road sign recognition process is performed on the basis of different assessment references for the first and second regions, and the third region. More specifically, in a case where it is estimated that the coordinate position on the screen of the road sign is included in the blur region as the third region, recognition of the road sign type is performed using a contour extraction threshold smaller than the one used in the first and second regions and a template and a dictionary with a small threshold, dedicated to the blur region. Therefore, it is possible to achieve in the image captured by the imaging apparatus, reduction of the effects of the third image region of the image, that is, a portion with degraded image quality, leading to achievement of discrimination of the road sign type with higher accuracy. Therefore, it is possible to obtain reliable recognition performance even in an imaging lens capable of long-distance and close proximity photography.

Second Embodiment

Next, a second embodiment will be described with reference to FIGS. 13 to 16. Note that the same reference numerals are attached to the constituent elements similar to those in the first embodiment, and a detailed description thereof will be omitted.

Figure 13:
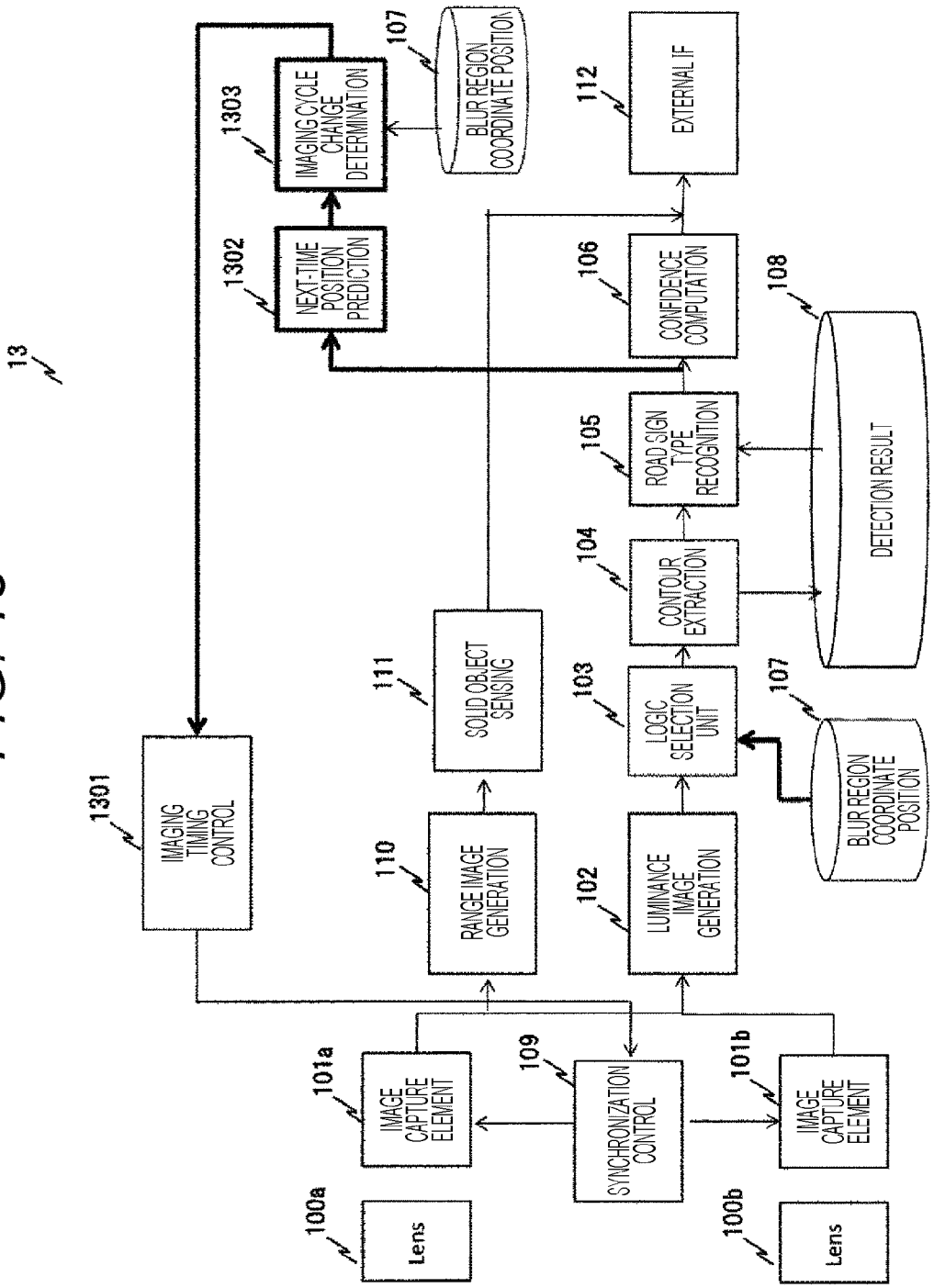
FIG. 13 is a functional block diagram illustrating an imaging apparatus according to a second embodiment of the present invention.

The present embodiment presents an example of avoiding the situation in which the road sign 1011 is imaged at the timing of time t(50) in FIG. 11 to be included in the blur region 1003, and thereby enhancing the accuracy. FIG. 13 illustrates a configuration.

FIG. 13 is a functional block diagram illustrating an imaging apparatus according to the second embodiment of the present invention. In addition to the configuration illustrated in FIG. 1, a next-time position prediction unit 1302, a processing cycle change determination unit 1303, and an imaging timing control unit 1301.

The next-time position prediction unit 1302 outputs a prediction result of predicting to which coordinate position on the screen the road sign 1011 is projected in the next frame on the basis of the position of the sign output from the road sign type recognition unit 105 and the vehicle speed information. The road sign 1011 is fixed on the ground and does not move. Accordingly, when the parameters (focal length, lens distortion information, attachment position) of the camera (first and second imaging units) are known, it is possible to calculate the projection position as the coordinate position on the screen from the vehicle speed and steering angle of the car.

Figure 14:
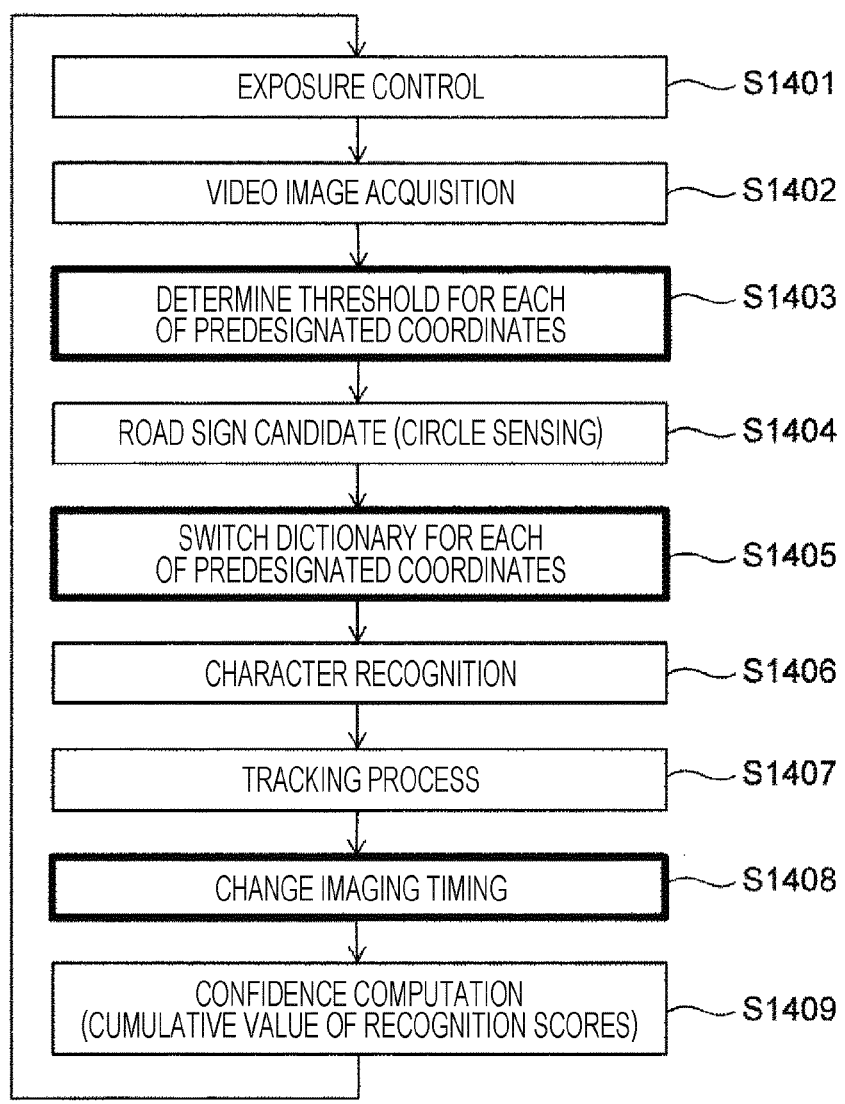
FIG. 14 is a flowchart illustrating a function of sensing road signs according to the second embodiment.

The processing cycle change determination unit 1303 judges whether the prediction result of the next-time position prediction unit 1302 is overlapping with the blur region, and outputs an adjustment value for finely adjusting the next photographing timing. FIG. 14 is an illustrative view in which a plurality of images captured at predetermined time intervals is superimposed. FIG. 14 is an illustrative view in which images at times t(0), t(50), and t(100) are superimposed. In a case where it is determined in the frame at time t(0) that the result of the processing cycle change determination unit 1303 indicates overlapping with the blur region, the processing cycle change determination unit 1303 performs adjustment to change processing cycles so as to allow photographing to be performed at time t(35) or t(70).

That is, when it is assumed that the coordinate position of the road sign in the image is included in the blur region (one image region) 1003 by photographing with a predetermined fixed cycle, the photographing timing is changed so as to allow the coordinate position to be included in one of the first and second regions (other image regions) 1001 and 1002. This adjustment enables recognition process without overlapping with the blur region, leading to achievement of satisfactory results. Generally, the recognition accuracy is higher with the image projected in large size on the screen. Accordingly, with a capability of photographing the road sign 1011 at time t(70), it is possible to achieve a road sign sensing function with higher accuracy.

Figure 15:
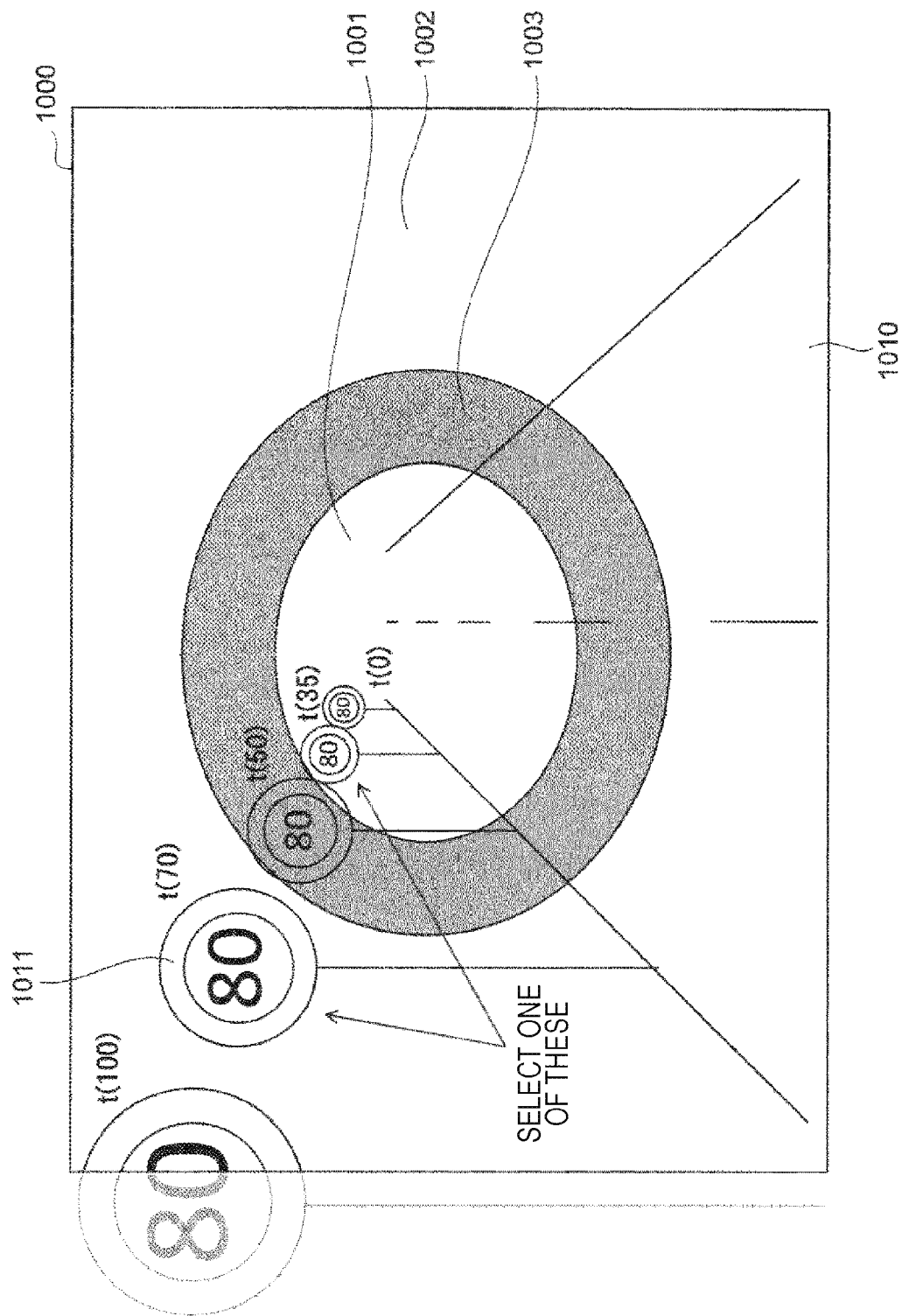
FIG. 15 is an illustrative view in which a plurality of images captured at predetermined time intervals is superimposed.

FIG. 14 is a flowchart illustrating a function of sensing a road sign in the second embodiment. FIG. 15 is an illustrative view in which a plurality of images captured at predetermined time intervals is superimposed. First, exposure control is performed (S1401) and an image is obtained (S1402). Then, the contour extraction unit 104 determines a contour extraction threshold for each of predesignated coordinates (S1403). For example, in a case where the coordinate position of the road sign candidate that is a target object candidate is included in the blur region 1003 in the image 1000, the contour extraction threshold is determined as a small value. Then, the contour extraction unit 104 performs circle sensing within the screen 1000 and determines a road sign candidate (S1404).

Next, the road sign type recognition unit 105 switches the dictionary for each of predesignated coordinates (S1405), performs character recognition (S1406), and then performs tracking process (S1407). In a case where the coordinate position of the road sign candidate that is the target object candidate is included in the blur region 1003 in the image 1000, the photographing timing is changed (S1408) so as to enable the road sign 1011 to be photographed before the blur region 1003 or immediately after the blur region 1003. Then, the confidence is calculated on the basis of the cumulative value of the recognition score (S1409).

Next, a waveform of an output signal of the CMOS sensor in a case where the processing cycle is changed in this manner will be described. FIG. 16 is a diagram illustrating output timings of a V synchronization signal of the CMOS sensor.

The signal illustrated in FIG. 16 is a signal referred to as a V synchronization signal of a CMOS sensor used for an image capture element. This signal is at High level an effective image is being output. In contrast to the conventional case where this signal is generated at constant cycles, it is observed that the present embodiment indicates a case where the V synchronization signal is output at a timing slightly earlier than the predetermined fixed cycle in a case where photographing is performed at the timing of time t(35) before the blur region 1003 in FIG. 15 with a shifted photographing timing. In addition, in the case of photographing at the timing of time t(70) behind the blur region 1003, the V synchronization signal is output at a timing slightly later than the predetermined fixed cycle. Still, it is observed that the cycle returns to the fixed cycle on and after the succeeding frame.

In this manner, with the photographing with a slight shift in the synchronization signal, it is possible to avoid the blur region and obtain a satisfactory recognition result.

As above, embodiments of the present invention have been described. The present invention is not limited to the above-described embodiments but may include various design modifications without departing from the spirit of the present invention described in claims. For example, the above-described embodiments give detailed explanation just to allow the present invention to be clearly understood. Therefore, the present invention is not limited to the case having all of components in the configuration. In addition, a portion of configuration of an embodiment can be replaced with a portion of configuration of another embodiment. A portion or the configuration of another embodiment can be added to a certain embodiment. Furthermore, it is possible to modify a portion of the configuration of each of the embodiments, such as addition, deletion, and replacement from another configuration.

REFERENCE SIGNS LIST

1 Imaging apparatus (object recognition device)
101a, 101b Image capture element
102 Luminance image generation unit
103 Logic selection unit
104 Contour extraction unit
105 Road sign type recognition unit (recognition processing unit)
106 Confidence computation unit
107 Storage unit
109 Synchronization control unit
110 Range image generation unit
111 Solid object sensing unit
1000 Screen
1001 First region (inner image region)
1002 Second region (outer image region)

1003 Third region (blur region=inflection point corresponding image region)
1011 Road sign
1301 Imaging timing control unit
1302 Magnetic field position prediction unit
1303 Imaging cycle change determination unit

The invention claimed is:

1. An object recognition device comprising:
an image acquirer, including a lens, configured to acquire an image including a plurality of image regions having different resolutions; and
at least one processor configured to perform a recognition process on an object in the image,
wherein
one image region of the image among the plurality of image regions has a lower resolution than another image region of the image, and
the at least one processor is configured to perform the recognition process on the object on the basis of different assessment references for each of the one image region and the another image region,
the another image region corresponds to an inner image region located on an inner side of the image and an outer image region located on an outer side of the image,
the one image region corresponds to an intermediate image region located between the inner image region and the outer image region,
the intermediate image region has a lower resolution than the inner image region and the outer image region,
a threshold of an assessment reference in the intermediate image region is smaller than a threshold of an assessment reference in the inner image region and the outer image region, and
the intermediate image region has a toroidal shape.

2. The object recognition device according to claim 1, wherein the at least one processor is configured to perform the recognition process on the object on the basis of different thresholds related to a luminance value.

3. The object recognition device according to claim 1, wherein the at least one processor is configured to perform the recognition process on the object by pattern matching on the basis of patterns different for each of the one image region and the another image region.

4. The object recognition device according to claim 1, wherein the at least one processor is configured to extract a contour of the object in the image, and
wherein in a case where a coordinate position of the object in the image is estimated to be included in the intermediate image region, the at least one processor uses a contour extraction threshold smaller than a contour extraction threshold to be used in the inner image region and the outer image region.

5. The object recognition device according to claim 1,
wherein the lens is arranged to have a magnification of a first incident angle site, having an incident angle smaller than an inflection point incident angle, and greater than a magnification of a second incident angle site, having an incident angle larger than the inflection point incident angle.

6. An object recognition device comprising:
an image acquirer, including a lens, configured to acquire an image including a plurality of image regions having different resolutions; and
at least one processor configured to perform a recognition process on an object in the image,
wherein one image region of the image among the plurality of image regions has a lower resolution than another image region,
an image to be obtained is an image photographed at a photographing timing at which the object relatively moving with respect to an own vehicle is included in the another image region,
the another image region corresponds to an inner image region located on an inner side of the image and an outer image region located on an outer side of the image,
the one image region corresponds to an intermediate image region located between the inner image region and the outer image region,
the intermediate image region has a lower resolution than the inner image region and the outer image region, and
the intermediate image region has a toroidal shape.

7. The object recognition device according to claim 6,
wherein in a case where the coordinate position of the object in the image is estimated to be included in the one image region by photographing with a predetermined fixed cycle, the photographing timing is changed so as to allow the coordinate position of the object in the image to be included in the another image region.

8. The object recognition device according to claim 6,
wherein the lens is arranged to have a magnification of a first incident angle site, having an incident angle smaller than an inflection point incident angle, and greater than a magnification of a second incident angle site, having an incident angle larger than the inflection point incident angle.

* * * * *